United States Patent [19]

Braun et al.

[11] Patent Number: 5,148,362

[45] Date of Patent: Sep. 15, 1992

[54] METHOD AND DEVICE FOR BALANCING A THREE-PHASE SYSTEM

[75] Inventors: Rüdiger Braun; Wilhelm Forstbauer, both of Erlangen, Fed. Rep. of Germany

[73] Assignee: Siemens Aktiengesellschaft, Berlin & Munich, Fed. Rep. of Germany

[21] Appl. No.: 742,293

[22] Filed: Aug. 8, 1991

[30] Foreign Application Priority Data

Aug. 16, 1990 [EP] European Pat. Off. ........ 90115699.2

[51] Int. Cl.$^5$ ............................................. H02M 7/48
[52] U.S. Cl. ........................................ 363/95; 363/37; 363/96; 363/98
[58] Field of Search .............. 363/34, 37, 95, 96, 363/98, 132, 137

[56] References Cited

U.S. PATENT DOCUMENTS

| 4,922,400 | 5/1990 | Cook | 363/132 |
|---|---|---|---|
| 4,977,492 | 12/1990 | Kirchberg et al. | 363/37 |
| 4,994,956 | 2/1991 | Kirchberg et al. | 363/98 |
| 5,008,801 | 4/1991 | Gleanon | 363/132 |
| 5,055,992 | 10/1991 | Cook | 363/37 |
| 5,057,989 | 10/1991 | Hirose et al. | 363/95 |

Primary Examiner—Steven L. Stephan
Assistant Examiner—Jeffrey L. Sterrett
Attorney, Agent, or Firm—Kenyon & Kenyon

[57] ABSTRACT

A method and a device balance a three-phase system (18) formed by means of an invertor (12) from a dc voltage source (10), the output (R', S', T') of said invertor (12) being provided with a filter (14) followed by a neutral grounding transformer (16). Positive and negative phase-sequence system components ($\bar{u}_{1s}$, $\bar{u}_{1c}$, $\bar{u}_{2c}$, $\bar{u}_{2s}$) are formed from the measured voltages ($u_R$, $u_S$, $u_T$). These measured voltages ($u_R$, $u_S$, $u_T$) form positive and negative phase-sequence system manipulated variables ($U_{St\phi}$, $U_{St1c}$, $U_{St2c}$, $U_{St2s}$). The positive and negative phase-sequence system manipulated variables ($U_{St1c}$, $U_{St2s}$, $U_{St2c}$) are transformed by means of a transformation device (50) into phase-to-neutral voltage manipulated variable ($U_{Str}$, $U_{Sts}$, $U_{Stt}$) and routed to angularly symmetrical drive units 76, 78, 80). A three-phase system (18) formed can thus be kept balanced, with means of the multivariable control systems, even with an unbalanced load.

8 Claims, 2 Drawing Sheets

METHOD AND DEVICE FOR BALANCING A THREE-PHASE SYSTEM

BACKGROUND OF THE INVENTION

The invention relates to methods and devices for balancing a three-phase system formed by means of an invertor from a direct-current (dc) voltage source, the output of said invertor being provided with a filter followed by a neutral grounding transformer.

A device for generating a balanced three-phase system with a loadable neutral conductor is known from European patent 0 208 088. That device comprises an invertor arrangement and a voltage-transforming means, and more particularly a floating three-phase voltage transformer with a Y-connection in the secondary circuit, which at the input end is connected to the invertor arrangement. Moreover, a filter is connected in series with the voltage-transforming means. A setpoint generator specifies three angularly symmetrical setpoints. Associated with each setpoint and alternating-current (ac) output of the invertor arrangement is a control system that is followed by a drive unit. The invertor arrangement consists of a pulse-width-modulated three-phase bridge invertor. A decoupling network mirroring the structure of the voltage-transforming means forms transformed instantaneous values, which correspond to a voltage system at the input of the voltage-transforming means, from instantaneous values corresponding to the phase-to-neutral voltages at the output of the series circuit. The control system and the decoupling network are connected together in such a way that they supply control voltages for each pair of branches from the setpoints and from measurands for the phase-to-neutral voltages of the output voltage system. These control voltages act upon an output of the invertor arrangement, and correct the deviation of the transformed measurands from the setpoints. With this device, instantaneous unbalances occurring at the terminals of the output voltage system can be quickly corrected. This can occur because each pair of the invertor arrangement is acted upon by a dedicated drive unit with a control voltage which rapidly changes, as in an unbalanced voltage system. The decoupling network permits conversion of the measurands to equivalent measurands of a system without a neutral conductor. These measurands which are converted are linked to the loadable neutral to be converted in the secondary circuit. As a result, equivalent actual values of a fictitious voltage system are available for control at the input of the voltage-transforming means. The control voltages formed are unbalanced.

From the article "Coordinate Transformations for Multi-term Regulation Systems for the Compensation and Symmetrization of Three-Phase Supplies" (Koordinatentransformationen fur MehrgroBen-Regelsysteme zur Kompensation und Symmetrierung von Drehstromnetzen), published in Siemens Forschungs- und Entwicklungs-Berichte, vol. 6 (1977), No. 1, pp. 29-38, a control system is known which is designed to control the thyristors of a reactive-current compensation system at all times so that the reactive-current loading of the electric power system is as low and as constant as possible and that the load on the power system overall is as nearly balanced as possible. The control system (FIG. 19 of the article) comprises two vector processors which convert the furnace currents and the thyristor currents into active- and reactive-current components of a positive and negative phase-sequence system. The active- and reactive-current components of the positive and negative phase-sequence system of the furnace currents serve as command references for the control of the compensation system. Each of the two vector processors comprises on the input side a transformation device (transformation from a three-phase system into two vectors), each of whose outputs is followed by a vector identifier followed by a vector rotator. The outputs of the vector rotators are linked to a transformation device (transformation of static vectors into positive phase-sequence system and negative phase-sequence system components). The article also gives examples for implementation of a vector identifier and a vector rotator. For the transformations, transformation matrices are given. Since the control system essentially has to process only command-reference changes, and since disturbance variations occur only as slight fluctuations of the bus voltage, provision is made for precontrol so that the controllers need only correct minor deviations. With this control system, the reactive component of the positive phase-sequence system of the line current is held to as small and as constant a value as possible, while the components of the negative phase-sequence system are maintained at the same time to very small values. If, in addition, the system load is to be balanced, the thyristor circuits must be controlled independently in all phases.

The present invention is directed to the problem of developing a method and a device for balancing a three-phase device such that the three-phase system formed can be balanced rapidly and simply with means of a multivariable control system.

SUMMARY OF THE INVENTION

The present invention solves this problem by determining the measured voltages of the three-phase system ($u_R$, $u_S$, $u_T$) and then transforming them into two voltage components ($u_\alpha$, $u_\beta$). Next, the method forms two rotational vectors ($\underline{u}_\alpha$, $\underline{u}_\beta$) from the two voltage components ($u_\alpha$, $u_\beta$), and converts these two rotational vectors ($\underline{u}_\alpha$, $\underline{u}_\beta$) into two vectors ($\overline{u}_\alpha$, $\overline{u}_\beta$), using a reference vector ($r$). These two vectors ($\overline{u}_\alpha$, $\overline{u}_\beta$). The method then transformed into two positive phase-sequence system components ($\overline{u}_{1s}$, $\overline{u}_{1c}$, and two second negative phase-sequence system components ($\overline{u}_{2c}$, $\overline{u}_{2s}$). The method then controls the two positive and negative phase-sequence system components ($\overline{u}_{1s}$, $\overline{u}_{1c}$, $\overline{u}_{2c}$, $\overline{u}_{2s}$) on the basis of four predetermined reference values ($\hat{u}_{1s}^*$, $\hat{u}_1^*$, $\hat{u}_{2c}^*$, $\hat{u}_{2s}^*$) in such a way that one of the positive phase-sequence system components ($\overline{u}_{1s}$) and both negative phase-sequence system components ($\overline{u}_{2c}$, $\overline{u}_{2s}$) are held to zero, while the other positive phase-sequence system component ($\overline{u}_{1c}$) is not held to zero. Next, the method forms a positive phase-sequence system manipulated variable ($U_{St1c}$) and two negative phase-sequence system manipulated variables ($U_{St2c}$, $U_{St2s}$) from three of the predetermined reference values ($\overline{u}_1^*$, $\overline{u}_{2c}^*$, $\overline{u}_{2s}^*$), from one of the positive phase-sequence system components ($\overline{u}_{1c}$) and from both negative phase-sequence system components ($\overline{u}_{2c}$, $\overline{u}_{2s}$). Next, the method transforms one of the positive phase-sequence system manipulated variables ($U_{St1c}$) and both negative phase-sequence system manipulated variables ($U_{St2c}$, $U_{St2s}$) into three phase-to-neutral manipulated variables ($U_{Str}$, $U_{Sts}$, $U_{Stt}$) according to EQUATIONs 1, 2 and 3.

$$U_{Str} = U_{St1c} 2 U_{St2c} \qquad \text{EQUATION 1}$$

$$U_{Sts} = U_{St1c} - U_{S\Omega c} - \sqrt{3} \cdot U_{S\Omega s} \quad \text{EQUATION 2}$$

$$U_{Stt} = U_{St1c} - U_{S\Omega c} + \sqrt{3} \cdot U_{S\Omega s} \quad \text{EQUATION 3}$$

Finally, the method routes these three phase-to-neutral voltage manipulated variables ($U_{Str}$, $U_{Sts}$, $U_{Stt}$) to three angularly symmetrical drive units.

In the method of the present invention, the measured voltages are transformed into two voltage components, each of which is transformed into a rotational vector. These rotational vectors are transformed into static vectors, which in turn are transformed into positive phase-sequence and negative phase-sequence system components. These positive and negative phase-sequence system components form the controlled variables of the three-phase system generated, which is to remain balanced regardless of the load, whether unbalanced or single-phase. The three-phase system is precisely balanced when only positive phase-sequence system components appear in the phase-to-phase voltages; in other words, the negative phase-sequence system controlled variables produced are held to zero. The positive phase-sequence system magnitude controlled variable is held to a predetermined reference value and the positive phase-sequence system phase controlled variable is held to zero. Positive and negative phase-sequence system manipulated variables are so obtained which, except for the positive phase-sequence system phase manipulated variable, are transformed into phase-to-neutral voltage manipulated variables which by means of angularly symmetrical drive units are routed to the invertor as control signals. The positive phase-sequence system phase manipulated variable shifts the phase relation of all three actuating signals. It is thus possible to keep a previously formed three-phase system balanced also with single-phase loading.

An advantageous method occurs when the step of converting the two rotational vectors ($\underline{u}_\alpha$, $\underline{u}_\beta$) into two vectors ($\overline{u}_\alpha$, $\overline{u}_\beta$) is performed by first transforming the two rotational vectors ($\underline{u}_\alpha$, $\underline{u}_\beta$) into two positive phase-sequence system components ($\overline{u}_{1s}$, $\overline{u}_{1c}$) and into two negative phase-sequence system component ($\overline{u}_{2c}$, $\overline{u}_{2s}$). Then, the advantageous method converts the two positive phase-sequence system components ($\overline{u}_{1s}$, $\overline{u}_{1c}$) and the two negative phase-sequence system components ($\overline{u}_{2c}$, $\overline{u}_{2s}$) into the two vectors by means of said reference vector (r).

An advantageous variation on the method of the present invention occurs when the rotational vectors ($\underline{u}_\alpha$, $\underline{u}_\beta$) are first transformed into positive phase-sequence system component values ($\overline{u}_{1s}$, $\overline{u}_{1c}$) and into negative phase-sequence system component values ($\overline{u}_{2c}$, $\overline{u}_{2s}$). Then the positive phase-sequence system component values ($u_{1s}$, $u_{1c}$) and the negative phase-sequence system component values ($u_{2c}$, $u_{2s}$) are converted into positive phase-sequence system component vectors ($\overline{u}_{1s}$, $\overline{u}_{1c}$) and into negative phase-sequence system component vectors ($\overline{u}_{2c}$, $\overline{u}_{2s}$) by means of a reference vector (r). Then the method controls the positive and negative phase-sequence system component vectors ($\overline{u}_{1s}$, $\overline{u}_{1c}$, $\overline{u}_{2c}$, $\overline{u}_{2s}$) on the basis of predetermined reference values ($\hat{u}_{1s}^*$, $\hat{u}_1^*$, $\hat{u}_{2c}^*$, $\hat{u}_{2s}^*$) in such a way that one of the positive phase-sequence system component vectors ($\overline{u}_{1s}$) and both of the negative phase-sequence system component vectors ($\overline{u}_{2c}$, $\overline{u}_{2s}$) are held to zero, while the other positive phase-sequence system component vector ($\overline{u}_{1c}$) is not held to zero.

An device for implementing the method of the present invention uses three transducers, one for each of the alternating-current outputs (R, S, T), to determine three measured voltages ($u_R$, $u_S$, $u_T$) of the three-phase system. The device includes a vector processor, following the three transducers, which vector processor transforms the three measured voltages ($u_R$, $u_S$, $u_T$) into two positive phase-sequence system components ($\overline{u}_{1s}$, $\overline{u}_{1c}$), and into two negative phase-sequence system components ($\overline{u}_{2c}$, $\overline{u}_{2s}$). The vector processor outputs these two positive phase-sequence system components ($\overline{u}_{1s}$, $\overline{u}_{1c}$), and two negative phase-sequence system components ($\overline{u}_{2c}$, $\overline{u}_{2s}$) to the minus input of four comparators. The four comparators have four command reference values ($\hat{u}_{1s}^*$, $\hat{u}_1^*$, $\hat{u}_{2c}^*$, $\hat{u}_{2s}^*$) as positive inputs, and form a positive phase-sequence system manipulated variable ($U_{St1c}$) and two negative phase-sequence system manipulated variables ($U_{S\Omega c}$, $U_{S\Omega s}$) from three of the predetermined reference values ($\hat{u}_1^*$, $\hat{u}_{2c}^*$, $\hat{u}_{2s}^*$), from one of the positive phase-sequence system components ($\overline{u}_{1c}$) and from both negative phase-sequence system components ($\overline{u}_{2c}$, $\overline{u}_{2s}$). The device also includes four controllers following the four comparators, which controllers control both positive and negative phase-sequence system components $\overline{u}_{1s}$, $\overline{u}_{1c}$, $\overline{u}_{2c}$, $\overline{u}_{2s}$), on the basis of the four predetermined reference values ($\hat{u}_{1s}^*$, $\hat{u}_1^*$, $\hat{u}_{2c}^*$, $\hat{u}_{2s}^*$), in such a way that one of the positive phase-sequence system components ($\hat{u}_{1s}$) and both of the negative phase-sequence system components ($\overline{u}_{2c}$, $\overline{u}_{2s}$) are held to zero, while the other positive phase-sequence system component ($\overline{u}_{1c}$) is not held to zero. The device includes a transformation device linked to the outputs of the controllers. The transformation device transforms one of the positive phase-sequence system manipulated variables ($U_{St1c}$) and both of the negative phase-sequence system manipulated variables ($U_{S\Omega c}$, $U_{S\Omega s}$) into three phase-to-neutral manipulated variables ($U_{Str}$, $U_{Sts}$, $U_{Stt}$) according to EQUATIONs 4, 5 and 6.

$$U_{Str} = U_{St1c} + 2U_{S\Omega c} \quad \text{EQUATION 4}$$

$$U_{Sts} = U_{St1c} - U_{S\Omega c} - \sqrt{3} \cdot U_{S\Omega s} \quad \text{EQUATION 5}$$

$$U_{Stt} = U_{St1c} - U_{St1c} + \sqrt{3} \cdot U_{S\Omega s} \quad \text{EQUATION 6}$$

Finally, the device includes three drive units coupled to the outputs of the transformation device. Each of the drive units is coupled to the output of one of the controllers.

An advantageous implementation of the vector processor uses an additional transformation device, which transforms the three measured voltages ($u_R$, $u_S$, $u_T$) into two voltage components ($u_\alpha$, $u_\beta$). The vector processor also includes two vector identifiers coupled to the outputs of the additional transformation device, which vector identifiers form two rotational vectors ($\underline{u}_\alpha$, $\underline{u}_\beta$) from the two voltage components ($u_\alpha$, $u_\beta$). The vector rotators are coupled to the outputs of the vector identifiers, and convert the two rotational vectors ($\underline{u}_\alpha$, $\underline{u}_\beta$) into two vectors ($\overline{u}_\alpha$, $\overline{u}_\beta$), by means of a reference vector (r). A second additional transformation device is coupled to the outputs of the vector rotators, which second additional transformation device transforms the vectors ($\overline{u}_\alpha$, $\overline{u}_\beta$) into two positive phase-sequence system components ($\overline{u}_{1s}$, $\overline{u}_{1c}$), and into two negative phase-sequence system components ($\overline{u}_{2c}$, $\overline{u}_{2s}$). These two positive and negative phase-sequence system components form the outputs of the vector processor.

Another advantageous implementation of the vector processor uses four smoothing filters coupled to the outputs of the vector processor, which filters output filtered positive and negative phase-sequence system components.

An advantageous embodiment of the present invention uses two further transformation devices coupled to the outputs of the vector identifiers. These two further transformation devices are followed by vector rotators with inputs coupled to the two further transformation devices.

Another advantageous embodiment of the present invention uses two adders. One of the adders is coupled to the output of one of the controllers, while the other adder is coupled to the output of another controller. The input of one of the adders receives a first precontrol value ($u_{Ra}$), and the input of the other adder receives a second precontrol value ($\hat{u}_1^*$).

Another advantageous embodiment of the present invention uses proportional-plus-integral controllers as the controllers.

DETAILED DESCRIPTION

Figure 1:
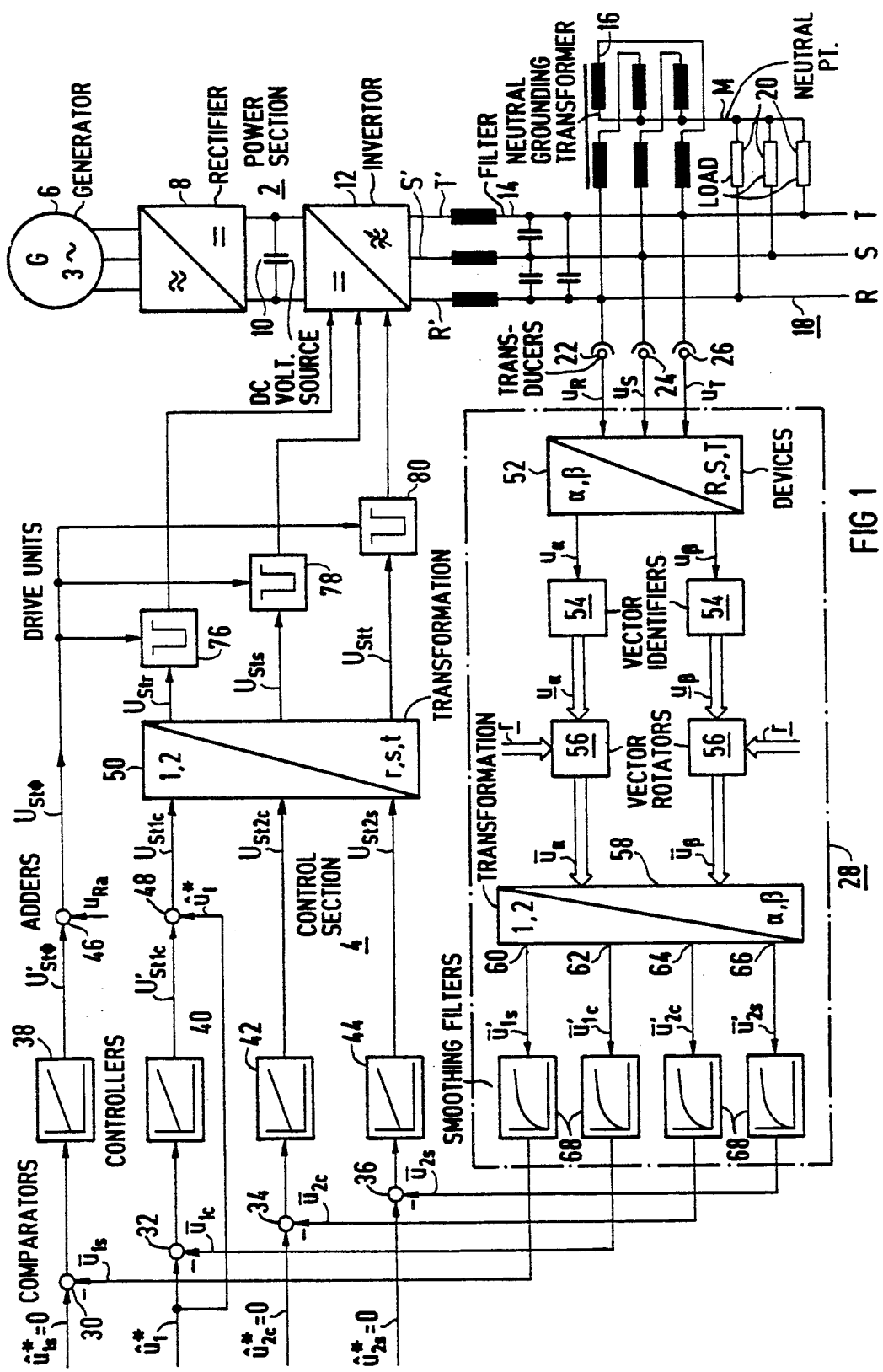
FIG. 1 shows the power section of a device including an embodiment of the control section of the present invention.

As shown in FIG. 1, a device forming a three-phase system with the outputs R, S and T consists of a power section 2 and a control section 4.

The power section 2 comprises a generator 6, such as a rotating rectifier-excited synchronous generator, which is followed by a rectifier 8 followed by a dc voltage source 10, for example, a battery. In place of the rectifier 8, an invertor or a two-way converter may be used. An invertor 12 connected at its input to the voltage source 10 and is provided at its output with a filter 14. The latter is followed by a neutral grounding transformer 16 which forms a neutral point M. Single-phase loading is thus made possible. A load 20 is connected between a neutral point and each of the individual three-phase outputs R, S and T of the three-phase system 18. The generator 6 may be driven by a jet propulsion plant, for example, the three-phase system 18 formed then being an aircraft electrical system of 3×115 V, 400 Hz. However, the generator 6 may also be driven by wind power, or the voltage source 10 may be a fuel cell, the three-phase system 18 then being an isolated network. In place of the generator 6, a supply network may be provided. The three-phase system 18 thus formed (an uninterruptable power system) is a secured three-phase system.

The control section 4 comprises three transducers 22, 24 and 26 on the input side, which transducers measure the three output voltages of the filter 14, i.e. the voltages $u_R$, $u_S$ and $u_T$. These measured voltages $u_R$, $u_S$ and $u_T$ are routed to a vector processor 28 which outputs positive and negative phase-sequence system components $\bar{u}_{1s}$, $\bar{u}_{1c}$, $\bar{u}_{2c}$ of the voltages $u_R$, $u_S$ and $u_T$.

The positive phase-sequence system component $\bar{u}_{1s}$ or $\bar{u}_{1c}$, respectively, is routed as an actual value to a comparator 30 or 32, respectively. The negative phase-sequence system component $\bar{u}_{2c}$ or $\bar{u}_{2s}$, respectively, is routed, also as an actual value, to a comparator 34 or 36, respectively. At the plus input of the comparator 30 or 32, or 34 or 36, a command reference $\hat{u}_{1s}^*$ or $\hat{u}_1^*$, or $\hat{u}_{2c}^*$ or $\hat{u}_{2s}^*$, is present. The output of the comparator 30 or 32, or 34 or 36, is linked to a controller 38 or 40, or 42 or 44, respectively. The controller 38 or 40 is followed by an adder 46 or 48, respectively, at whose second input a precontrol value $u_{Ra}$ or $\hat{u}_1^*$ is present. The output of the adder 48 and the outputs of the controllers 42 and 44 are connected to a transformation device 50, one embodiment of which is shown in detail in FIG. 2. At the outputs of the transformation device 50, phase-to-neutral voltage manipulated variables $U_{Str}$, $U_{Sts}$ and $U_{Stt}$ are present. At the output of the adder 46 a phase manipulated variable $U_{St\phi}$ is present. These manipulated variables $U_{Str}$, $U_{Sts}$ and $U_{Stt}$ are connected to a drive unit 76, 78 and 80, respectively, of the invertor 12. The three drive units 76, 78 and 80 are controlled with angular symmetry. The positive phase-sequence system phase manipulated variable $U_{St\phi}$ controls the phase relation of all three drive units 76, 78 and 80.

The vector processor 28 has a transformation device 52 on its input side, whose outputs are fed to a vector identifier 54 followed by a vector rotator 56. The outputs of the vector rotators 56 are connected to another transformation device 58. This transformation device 58 has positive phase-sequence system outputs 60 and 62 and negative phase-sequence system outputs 64 and 66, which are fed to respective actual-value smoothing filters 68. The outputs of the vector identifiers may also be linked to a transformation device 58 followed by a vector rotator 56. The outputs of the actual-value smoothing filters 68, which form the outputs of the vector processor 28, are linked to a minus input of the comparators 30, 32, 34 and 36.

Such a vector processor 28 is known from the article, "Coordinate Transformations for Multi-term Regulation Systems for the Compensation and Symmetrization of Three-Phase Supplies" (Koordinatentransformationen für MehrgroBen-Regelsysteme zur Kompensation und Symmetrierung von Drehstromnetzen), published in Siemens Forschungs- und Entwicklungs-Berichte, vol. 6 (1977), No. 1, pp. 29–38. That article also gives examples for the implementation of the vector identifier 54, the vector rotator 56, the input-side transformation device 52 and the second transformation device 58. For this reason, a description of embodiments of the components of the vector processor 28 is unnecessary.

The measured voltages $u_R$, $u_S$ and $u_T$ form a three-phase voltage system R, S and T which is transformed into two voltage components $u_\alpha$ and $u_\beta$ by means of the input-side transformation device 52 of the vector processor 28. Each voltage component represents a sinusoidal wave oscillation, represented by EQUATIONs 7 and 8.

$$u_\alpha' = \hat{u}_\alpha \cdot \text{COS}(\omega t + \phi_\alpha) \qquad \text{EQUATION 7}$$

$$u_\beta' = \hat{u}_\beta \cdot \text{COS}(\omega t + \phi_\beta) \qquad \text{EQUATION 8}$$

The vector identifier 56 determines for each given cosine-wave oscillation the corresponding sine-wave oscillation, represented by EQUATIONs 9 and 10.

$$u_\alpha'' = \hat{u}_\alpha \cdot \text{SIN}(\omega t + \phi_\alpha) \qquad \text{EQUATION 9}$$

$$u_\beta'' = \hat{u}_\beta \cdot \text{SIN}(\omega t + \phi_\beta) \qquad \text{EQUATION 10}$$

The two oscillations together form a rotational vector $u_\alpha$ and $u_\beta$ in which the given cosine-wave oscillation is defined as the real part and the corresponding sine-wave oscillation as the imaginary part, represented by EQUATIONs 11 and 12.

$$u_\alpha = \hat{u}_\alpha \cdot (\cos(\omega t + \phi_\alpha) + j \sin(\omega t + \phi_\alpha)) \quad \text{EQUATION 11}$$

$$u_\alpha = \hat{u}_\beta \cdot (\cos(\omega t + \phi_\alpha) + j \sin(\omega t + \phi_\alpha)) \quad \text{EQUATION 12}$$

These rotational vectors $u_\alpha$ and $u_\beta$ are converted into static vectors (also called vectors $\bar{u}_\alpha$ and $\bar{u}_\beta$) by means of the vector rotator 56, which receives a reference vector according to EQUATION 13.

$$r = \cos(\omega t) + j \sin(\omega t) \quad \text{EQUATION 13}$$

The reference vector r is a unit vector. The vectors $\bar{u}_\alpha$ and $\bar{u}_\beta$ may be represented according to EQUATIONs 14 and 15.

$$u_\alpha = \hat{u}_\alpha \cdot (\cos\phi_\alpha + j \sin\phi_\alpha) \quad \text{EQUATION 14}$$

$$u_\beta = \hat{u}_\beta \cdot (\cos\phi_\beta + j \sin\phi_\beta) \quad \text{EQUATION 15}$$

These vectors $\bar{u}_\alpha$ and $\bar{u}_\beta$ are now transformed by means of the second transformation device 58 into positive and negative phase-sequence system components $\bar{u}_{1s}'$, $\bar{u}_{1c}'$, $\bar{u}_{2c}'$ and $\bar{u}_{2s}'$. These positive and negative phase-sequence system components ($\bar{u}_{1s}'$, $\bar{u}_{1c}'$, $\bar{u}_{2c}'$ and $\bar{u}_{2s}'$) may be represented according to EQUATIONs 16-19.

$$u_{1s} = \hat{u}_1 \sin\phi_1 \quad \text{EQUATION 16}$$

$$u_{1c} = \hat{u}_1 \cos\phi_1 \quad \text{EQUATION 17}$$

$$u_{2c} = \hat{u}_2 \cos\phi_2 \quad \text{EQUATION 18}$$

$$u_{2s} = \hat{u}_2 \sin\phi_2 \quad \text{EQUATION 19}$$

(Note: ' denotes the unfiltered components).

Now if 0° is chosen for the phase angle $\phi_1$ of the positive phase-sequence system, then the positive phase-sequence system component $\bar{u}_{1c}$ gives the quantity for the magnitude of the positive phase-sequence system. If 90° is chosen for the phase angle $\phi_1$ of the positive phase-sequence system, then the positive phase-sequence system component $\bar{u}_{1s}$ gives the quantity for the magnitude of the positive phase-sequence system. However, any desired value between 0° and 360° may be chosen for the phase angle $\phi_1$ of the positive phase-sequence system. For simplicity of control, the phase angle $\phi_1$ here is 0°, the command reference for the positive phase-sequence system phase then equals zero. In other words, the positive phase-sequence system component $\bar{u}_{1s}$ formed is held to zero, and the positive phase-sequence system component $\bar{u}_{1c}$ is held to a predetermined positive phase-sequence system magnitude command reference $\hat{u}_1^*$.

Since the three-phase system 18 formed is to remain balanced at all times regardless of the loading state, only positive phase-sequence system components must be present in the measured voltages $u_R$, $u_S$ and $u_T$. From this it follows that the negative phase-sequence system components $\bar{u}_{2c}$ and $\bar{u}_{2s}$ are held to zero. In keeping with the components present at the comparators 30, 32, 34 and 36, the controllers 38, 40, 42 and 44 are also referred to as positive phase-sequence system phase controller 38, positive phase-sequence system magnitude controller 40, and negative phase-sequence system magnitude controllers 42 and 44.

Since only the positive phase-sequence system is of importance for balancing and since the controlled variable of that system fluctuates about a command reference, the positive phase-sequence system phase controller 38 and the positive phase-sequence magnitude controller 40 are followed by an adder 46 and 48, respectively. As a result, a precontrol value $u_{R\alpha}$ is added to the manipulated variable $U_{st\phi}'$ formed, and a precontrol value $\hat{u}_1^*$ (positive phase-sequence system magnitude command reference) to the manipulated variable $U_{St1c}'$ formed.

Since the voltage system R', S' and T' has only a fictitious neutral point at the output of the invertor 12, the zero phase-sequence system can be disregarded in these multivariable control systems as it has no influence on the balancing of the three-phase system 18 formed.

Figure 2:
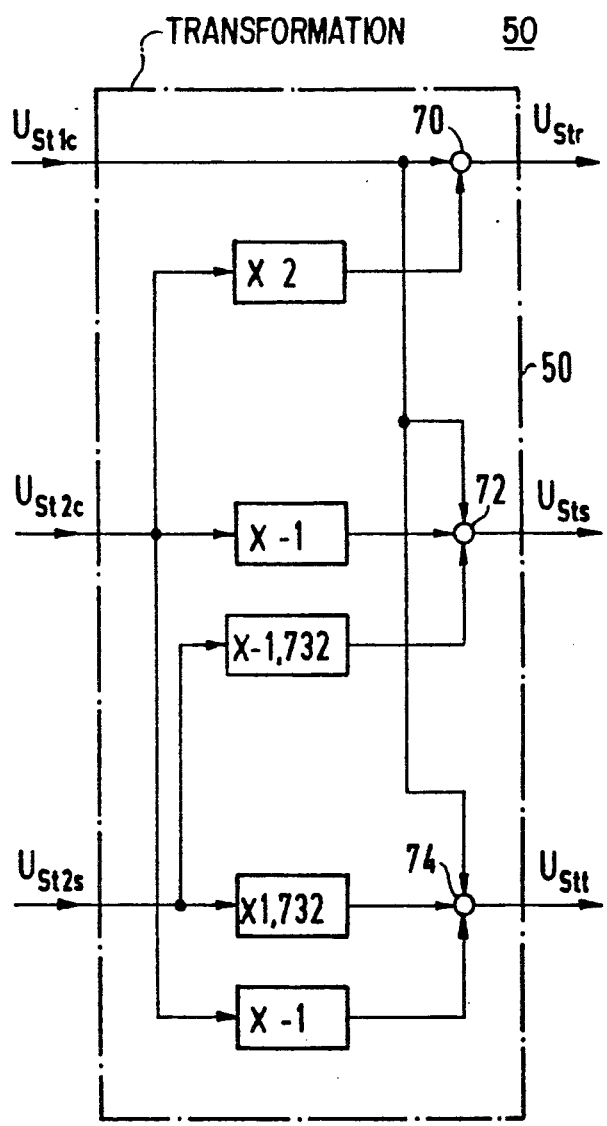
FIG. 2 shows an embodiment of the transformation device of the control section of FIG. 1.

Shown in detail in FIG. 2 is an exemplary embodiment of the transformation device 50 whereby phase-to-neutral voltage manipulated variables $U_{Str}$, $U_{Sts}$ and $U_{Stt}$ are formed from the positive and negative phase-sequence system manipulated variables $U_{St1c}$, $U_{St2c}$ and $U_{St2s}$ formed by means of the positive phase-sequence magnitude controller 40 and the negative phase-sequence magnitude controller 42. The phase-to-neutral voltage manipulated variables $U_{Str}$, $U_{Sts}$ and $U_{Stt}$ are formed from positive and negative phase-sequence system manipulated variables $U_{St1c}$, $U_{St2c}$ and $U_{St2s}$ according to EQUATIONs 20-25.

$$U_{Str} = U_{St1c} + 2U_{St2c} \quad \text{EQUATION 20}$$

$$U_{Sts} = U_{St1c} - U_{St2c} - \sqrt{3} \cdot U_{St2s} \quad \text{EQUATION 21}$$

$$U_{Stt} = U_{St1c} - U_{St2c} + \sqrt{3} \cdot U_{St2s} \quad \text{EQUATION 22}$$

$$U_{St1c} = U_1 \cos\phi_1 \quad \text{EQUATION 23}$$

$$U_{St2c} = U_2 \cos\phi_2 \quad \text{EQUATION 24}$$

$$U_{St2s} = U_2 \sin\phi_2 \quad \text{EQUATION 25}$$

According to these equations, the transformation device 50 comprises three adders 70, 72 and 74 and three signed factors. The positive phase-sequence system manipulated variable $U_{St1c}$ is present at one input of each of the three adders 70, 72 and 74. At the second input of the adder 70, the negative phase-sequence manipulated variable $U_{St2c}$, weighted with the factor 2, is present. It is also present with the factor $-1$ at the second input of each of the adders 72 and 74. At the third input of each of the adders 72 and 74, the negative phase-sequence system manipulated variable $U_{St2s}$, weighted with the factor $\sqrt{3} = 1.732$, is present, this factor $\sqrt{3}$ being negative for determination of the phase-to-neutral voltage manipulated variable $U_{Sts}$.

With these multivariable control systems consisting of known components, the three-phase system 18 formed can be maintained at all times in a balanced condition, regardless of load, if the negative phase-sequence system components are held to zero and the positive phase-sequence system magnitude component is held to a predetermined reference value. Since this control system can be implemented largely with software, a compact setup is achieved. The system is used as an on-board electrical system. However, it can also be used to form an isolated network or a secured three-phase system.

What is claimed is:

1. A method for balancing a three-phase system formed by means of an invertor from a direct-current (dc) voltage source, an output of the invertor having a filter followed by a neutral grounding transformer, said method comprising the steps of:
   a) determining a first, second and third measured voltage ($u_R$, $u_S$, $u_T$) of the three-phase system;
   b) transforming the first, second and third measured voltages ($u_R$, $u_S$, $u_T$) into a first and second voltage component ($u_\alpha$, $u_\beta$),
   c) forming a first and second rotational vector ($\underline{u}_\alpha$, $\underline{u}_\beta$) from said first and second voltage components ($u_\alpha$, $u_\beta$), respectively;
   d) converting said first and second rotational vectors ($\underline{u}_\alpha$, $\underline{u}_\beta$) into a first and second vector ($\bar{u}_\alpha$, $\bar{u}_\beta$), respectively, by means of a reference vector ($r$);
   e) transforming said first and second vectors ($\bar{u}_\alpha$, $\bar{u}_\beta$) into a first and second positive phase-sequence system component ($\bar{u}_{1s}$, $\bar{u}_{1c}$), respectively, and into a first and second negative phase-sequence system component ($\bar{u}_{2c}$, $\bar{u}_{2s}$), respectively;
   f) controlling said first and second positive and negative phase-sequence system components ($\bar{u}_{1s}$, $\bar{u}_{1c}$, $\bar{u}_{2c}$, $\bar{u}_{2s}$) on the basis of a first, second, third and fourth predetermined reference value ($\hat{u}_{1s}^*$, $\hat{u}_1^*$, $\hat{u}_{2c}^*$, $\hat{u}_{2s}^*$) in such a way that said first positive phase-sequence system component ($\bar{u}_{1s}$) and said first and second negative phase-sequence system components ($\bar{u}_{2c}$, $\bar{u}_{2s}$) are held to zero, while said second positive phase-sequence system component ($\bar{u}_{1c}$) is not held to zero;
   g) forming a first positive phase-sequence system manipulated variable ($U_{St1c}$) and a first and second negative phase-sequence system manipulated variable ($U_{St2c}$, $U_{St2s}$) from said second, third and fourth predetermined reference values ($\hat{u}_1^*$, $\hat{u}_{2c}$, $\hat{u}_{2s}^*$), from said second positive phase-sequence system component ($\bar{u}_{1c}$) and from said first and second negative phase-sequence system components ($\bar{u}_{2c}$, $\bar{u}_{2s}$);
   h) forming a positive phase-sequence phase manipulated variable ($U_{Stl}$) from said first predetermined reference value ($\hat{u}_{1s}^*$), from said first positive phase-sequence system component ($\bar{u}_{1s}$) and from a first precontrol value ($U_{Ra}$);
   i) transforming said first positive phase-sequence system manipulated variable ($U_{St1c}$) and said first and second negative phase-sequence system manipulated variables ($U_{St2c}$, $U_{St2s}$) into a first, second and third phase-to-neutral manipulated variable ($U_{Str}$, $U_{Sts}$, $U_{Stt}$) according to an Equation I, an Equation II, and an Equation III;

$$U_{Str} = U_{St1c} + 2U_{St2c} \quad \text{Equation I}$$

$$U_{Sts} = U_{St1c} - U_{St2c} - \sqrt{3} \cdot U_{St2s} \quad \text{Equation II}$$

$$U_{Stt} = U_{St1c} - U_{St2c} + \sqrt{3} \cdot U_{St2s} \quad \text{Equation III}$$

j) routing said first, second and third phase-to-neutral voltage manipulated variables ($U_{Str}$, $U_{Sts}$, $U_{Stt}$) to a first, second and third angularly symmetrical drive unit, respectively; and
   k) controlling a phase relation of said first, second and third angularly symmetrical drive units by said positive phase-sequence phase manipulated variable ($U_{Stl}$).

2. The method according to claim 1, wherein said step (d) of converting further comprises the steps of:
   a) transforming said first and second rotational vectors ($\underline{u}_\alpha$, $\underline{u}_\beta$) into a first and second positive phase-sequence system component ($\bar{u}_{1s}$, $\bar{u}_{1c}$) and into a first and second negative phase-sequence system component ($\bar{u}_{2c}$, $\bar{u}_{2s}$); and
   b) converting said first and second positive phase-sequence system components ($\bar{u}_{1s}$, $\bar{u}_{1c}$) and said first and second negative phase-sequence system components ($\bar{u}_{2c}$, $\bar{u}_{2s}$) into said first and second vectors $\bar{u}_\alpha$, $\bar{u}_\beta$) by means of said reference vector ($r$).

3. A method for balancing a three-phase system formed by means of an invertor from a direct-current (dc) voltage source, an output of the invertor having a filter followed by a neutral grounding transformer, said method comprising the steps of:
   a) determining a first, second and third measured voltage ($u_R$, $u_S$, $u_T$) of the three-phase system;
   b) transforming the first, second and third measured voltages ($u_R$, $u_S$, $u_T$) into a first and second voltage component ($u_\alpha$, $u_\beta$);
   c) forming a first and second rotational vector ($\underline{u}_\alpha$, $\underline{u}_\beta$) from said first and second voltage components ($u_\alpha$, $u_\beta$), respectively;
   d) transforming said first and second rotational vectors ($\underline{u}_\alpha$, $\underline{u}_\beta$) into a first and second positive phase-sequence system component value ($u_{1s}$, $u_{1c}$) and into a first and second negative phase-sequence system component value ($u_{2c}$, $u_{2s}$); and
   e) converting said first and second positive phase-sequence system component values ($u_{1st}$, $u_{1c}$) and said first and second negative phase-sequence system component values ($u_{2c}$, $u_{2s}$) into a first and second positive phase-sequence system component vector ($\bar{u}_{1st}$, u,ovs/u/$_{1c}$) and into a first and second negative phase-sequence system component vector ($\bar{u}_{2c}$, $\bar{u}_{2s}$) by means of a reference vector ($r$);
   f) controlling said first and second positive and negative phase-sequence system component vectors ($\bar{u}_{1s}$, $\bar{u}_{1c}$, $\bar{u}_{2c}$, $\bar{u}_{2s}$) on the basis of a first, second, third and fourth predetermined reference value ($u_{1s}^*$, $u_1^*$, $u_{2c}^*$, $u_{2s}^*$) in such a way that said first positive phase-sequence system component vector ($\bar{u}_{1s}$) and said first and second negative phase-sequence system component vectors ($\bar{u}_{2c}$, $\bar{u}_{2s}$) are held to zero, while said second positive phase-sequence system component vector ($\bar{u}_{1c}$) is not held to zero;
   g) forming a first positive phase-sequence system manipulated variable ($U_{St1c}$) and a first and second negative phase-sequence system manipulated variable ($U_{St2c}$, $U_{St2s}$) from said second, third and fourth predetermined reference values ($u_1^*$, $u_{2c}^*$, $i_{2s}^*$), from said second positive phase-sequence system component vector ($\bar{u}_{1c}$) and from said first and second negative phase-sequence system components vectors ($\bar{u}_{2c}$, $\bar{u}_{2s}$);

h) forming a positive phase-sequence phase manipulated variable ($U_{St1}$) from said first predetermined reference value ($\hat{u}_{1s}^*$), from said first positive phase-sequence system component ($\bar{u}_{1s}$) and from a first precontrol value ($U_{Ra}$);

i) transforming said first positive phase-sequence system manipulated variable ($U_{St1c}$) and said first and second negative phase-sequence system manipulated variables ($U_{St2c}$, $U_{St2s}$) into a first, second and third phase-to-neutral manipulated variable ($U_{Str}$, $U_{Sts}$, $U_{Stt}$) according to an Equation I, an Equation II, and an Equation III;

$$U_{Str} = U_{St1c} + 2U_{St2c} \quad \text{Equation I}$$

$$U_{Sts} = U_{St1c} - U_{St2c} - \sqrt{3} \cdot U_{St2s} \quad \text{Equation II}$$

$$U_{Stt} = U_{St1c} - U_{St2c} + \sqrt{3} \cdot U_{St2s} \quad \text{Equation III}$$

and j) routing said first, second and third phase-to-neutral voltage manipulated variables ($U_{Str}$, $U_{Sts}$, $U_{Stt}$) to a first, second and third angularly symmetrical drive unit, respectively; and k) controlling a phase relation of said first, second and third angularly symmetrical drive units by said positive phase-sequence phase manipulated variable ($U_{St1}$).

4. A device for balancing a three-phase system formed by means of an invertor from a direct-current (dc) voltage source, having a first, second and third alternating-current (ac) output with a filter followed by a neutral grounding transformer, said system comprising:

a) a first, second and third transducer for the first, second and third alternating-current outputs (R, S, T) determining a first, second and third measured voltage ($u_R$, $u_S$, $u_T$) of the three-phase system;

b) a vector processor following said first, second and third transducers;
 (i) transforming the first, second and third measured voltages ($u_R$, $u_S$, $u_T$) into a first and second positive phase-sequence system component ($\bar{u}_{1s}$, $\bar{u}_{1c}$), respectively, and into a first and second negative phase-sequence system component ($\bar{u}_{2c}$, $\bar{u}_{2s}$), respectively; and
 (ii) having said first and second positive phase-sequence system components ($\bar{u}_{1s}$, $\bar{u}_{1c}$), and said first and second negative phase-sequence system components ($\bar{u}_{2c}$, $\bar{u}_{2s}$) as a first, second, third and fourth output;

c) a first, second, third and fourth comparator:
 (i) having a minus input coupled to the first, second, third and fourth outputs of the vector processor, respectively; and
 (ii) having as a first, second, third, and fourth positive input a first, second, third and fourth command reference values ($\hat{u}_{1s}^*$, $\hat{u}_1^*$, $u_{2c}^*$, $\hat{u}_{2s}^*$), respectively; and
 (iii) having a first, second, third and fourth output, respectively;

d) a first controller receiving the first output from said first comparator, having as an output a positive phase-sequence phase manipulated variable ($U_{St1}$), and controlling said first positive phase-sequence system component ($\bar{u}_{1s}$) on the basis of the first predetermined reference value ($u_{1s}^*$) in such a way that said first positive phase-sequence system component ($\bar{u}_{1s}$) is held to zero;

e) a second controller receiving the second output from said second comparator, having as an output a first positive phase-sequence system manipulated variable ($U_{St1c}$) and controlling said second positive phase-sequence system component ($\bar{u}_{1c}$) on the basis of the second predetermined reference value ($\hat{u}_1^*$) in such a way that said second positive phase-sequence system component ($\bar{u}_{1c}$) is not held to zero;

f) a third controller receiving the third output from said third comparator, having as an output a first negative phase-sequence system manipulated variable ($U_{St2c}$) and controlling said first negative phase-sequence system component ($\bar{u}_{2c}$) on the basis of the third predetermined reference value ($\hat{u}_{2c}^*$) in such a way that said first negative phase-sequence system component ($\bar{u}_{2c}$) is held to zero;

g) a fourth controller receiving the fourth output from said fourth comparator, having as an output a second negative phase-sequence system manipulated variable ($U_{St2s}$) and controlling said second negative phase-sequence system component ($\bar{u}_{2s}$) on the basis of the fourth predetermined reference value ($\hat{u}_{2s}^*$) in such a way that said second negative phase-sequence system component ($\bar{u}_{2s}$) is held to zero;

h) a transformation device:
 (i) being linked to the outputs of said second, third and fourth controllers;
 (ii) having first, second and third outputs; and
 (iii) transforming said first positive phase-sequence system manipulated variable ($U_{St1c}$) and said first and second negative phase-sequence system manipulated variables ($U_{St2c}$, $U_{St2s}$) into a first, second and third phase-to-neutral manipulated variable ($U_{Str}$, $U_{Sts}$, $U_{Stt}$) according to an Equation I, an Equation II, and an Equation III;

$$U_{Str} = U_{St1c} + 2U_{St2c} \quad \text{Equation I}$$

$$U_{Sts} = U_{St1c} - U_{St2c} - \sqrt{3} \cdot U_{St2s} \quad \text{Equation II}$$

$$U_{Stt} = U_{St1c} - U_{St2c} + \sqrt{3} \cdot U_{St2s} \quad \text{Equation III}$$

and i) a first, second, and third drive unit coupled to the first, second and third outputs of the transformation device and each of said first, second and third drive units being coupled to the output of the first controller, whereby said positive phase-sequence phase manipulated variable ($U_{St1}$) controls a phase relation of said first, second and third drive units.

5. The device according to claim 4, wherein said vector processor further comprises:

a) a first additional transformation device transforming the first, second and third measured voltage ($u_R$, $u_S$, $u_T$) into a first and second voltage component ($u_\alpha$, $u_\beta$), and having the first and second voltage components ($u_\alpha$, $u_\beta$) as a first and second output;

b) a first and second vector identifier being coupled to the first and second outputs of the additional transformation device, forming a first and second rotational vector ($u_\alpha$, $u_\beta$) from the first and second voltage components ($u_\alpha$, $u_\beta$), respectively, and each of said first and second vector identifier having an output; and c) a first and second vector rotator being coupled to the outputs of the first and second vector identifiers, respectively, converting said first and second rotational vectors ($\underline{u}_\alpha$, $\underline{u}_\beta$) into a first and second vector ($\bar{u}_\alpha$, $\bar{u}_\beta$), respectively, by means of a reference vector (r) and each of said first and second vector rotators having an output; and d) a second additional transformation device being coupled to the outputs of the first and second vector rotators, transforming said first and second vectors ($\bar{u}_\alpha$, $\bar{u}_\beta$) into said first and second positive phase-sequence system components ($\bar{u}_{1s}$, $\bar{u}_{1c}$), respectively, and into said first and second negative phase-sequence system components ($\bar{u}_{2c}$, $\bar{u}_{2s}$), respectively, wherein said first and second positive phase-sequence system components form said first and second outputs of the vector processor, and said first and second negative phase-sequence system components form said third and fourth outputs of the vector processor.

6. The device according to claim 5, further comprising a first, second third and fourth smoothing filter having an input coupled to the first, second, third and fourth outputs of the vector processor, respectively, and outputting a first and second filtered positive phase-sequence system component and a first and second filtered negative phase-sequence system component.

7. The device according to claim 4, wherein said first, second, third and fourth controllers comprise a first, second, third and fourth proportional-plus-integral controller, respectively.

8. The device according to claim 4, further comprising a first and second adder, each of said first and second adders having a first and second input, said first input of the first adder being coupled to the output of said first controller, said first input of the second adder being coupled to the output of said second controller, said second input of said first adder receiving a first precontrol value ($u_{Ra}$), and said second input of said second controller receiving a second precontrol value ($\hat{u}_1^*$).

* * * * *